United States Patent
Wall et al.

(10) Patent No.: US 8,930,160 B2
(45) Date of Patent: Jan. 6, 2015

(54) MEASUREMENT SYSTEM FOR THE WIRELESS POSITION-INDEPENDENT MEASUREMENT OF THE TEMPERATURE

(75) Inventors: Bert Wall, Potsdam (DE); Richard Gruenwald, Potsdam (DE)

(73) Assignee: Vectron International GmbH, Teltow (DE)

( * ) Notice: Subject to any disclaimer, the term of this patent is extended or adjusted under 35 U.S.C. 154(b) by 422 days.

(21) Appl. No.: 13/389,643

(22) PCT Filed: Aug. 19, 2010

(86) PCT No.: PCT/EP2010/062120
§ 371 (c)(1),
(2), (4) Date: Feb. 9, 2012

(87) PCT Pub. No.: WO2011/020888
PCT Pub. Date: Feb. 24, 2011

(65) Prior Publication Data
US 2012/0143559 A1 Jun. 7, 2012

(30) Foreign Application Priority Data

Aug. 19, 2009 (DE) .......................... 10 2009 028 664
Nov. 23, 2009 (DE) .......................... 10 2009 056 060

(51) Int. Cl.
*G01K 1/00* (2006.01)
*G01K 11/26* (2006.01)
*G01K 7/32* (2006.01)

(52) U.S. Cl.
CPC ................ *G01K 11/265* (2013.01); *G01K 7/32* (2013.01)
USPC ....................................................... 702/130

(58) Field of Classification Search
None
See application file for complete search history.

(56) References Cited

U.S. PATENT DOCUMENTS

| 5,214,668 A | 5/1993 | Satou et al. |
| 2002/0150141 A1 | 10/2002 | Kishi |
| 2004/0069776 A1* | 4/2004 | Fagrell et al. ................. 219/690 |
| 2006/0219705 A1 | 10/2006 | Beier et al. |
| 2009/0188396 A1* | 7/2009 | Hofmann et al. ............... 99/342 |
| 2010/0313398 A1* | 12/2010 | Chommeloux et al. ..... 29/25.35 |

FOREIGN PATENT DOCUMENTS

| DE | 38 41 722 A1 | 6/1990 |
| DE | 102004047758 A1 | 4/2006 |
| DE | 10 2005 015 028 B4 | 3/2008 |

(Continued)

OTHER PUBLICATIONS

Bernd Neubig & Wolf tal Cook Book, Chapter 2, pp. 201-296, 1997.

(Continued)

*Primary Examiner* — Aditya Bhat
(74) *Attorney, Agent, or Firm* — Norris McLaughlin & Marcus, P.A.

(57) ABSTRACT

The invention relates to a measurement system for the wireless and position-independent measurement of the temperature of the load of an oven with high accuracy using passive temperature probes. The measurement system for the wireless measurement of the temperature of food or workpieces in ovens has an interrogation unit located outside the oven chamber, one or more interrogation antennas located in the oven chamber and at least one passively operated temperature probe with a probe antenna and at least one temperature sensor designed as a resonator, said temperature probe being freely movable within the oven, characterized in that the temperature sensor has at least two resonances with different temperature coefficients of frequency, wherein the electrical equivalent circuit diagrams of the resonance elements differ only slightly from each other.

12 Claims, 3 Drawing Sheets

(56) References Cited

FOREIGN PATENT DOCUMENTS

| DE | 102007020176 A1 | 10/2008 |
| EP | 1 882 169 B1 | 4/2009 |
| FR | 2 907 284 A1 | 4/2008 |
| WO | 03/081195 A1 | 10/2003 |
| WO | 2006/123085 A1 | 11/2006 |

OTHER PUBLICATIONS

International Search Report, dated Nov. 25, 2010, mailed Dec. 6, 2010.

Buff, W.; "A Differential Measurement SAW Device for Passive Remote Sensoring"; 1996 IEEE Ultrasonics Symposium; pp. 343-346; Technical University of Ilmenau, Institute of Solid State Electronics, Ilmenau, Thuringia, Germany.

* cited by examiner

MEASUREMENT SYSTEM FOR THE WIRELESS POSITION-INDEPENDENT MEASUREMENT OF THE TEMPERATURE

This application is a 371 application of PCT/EP2010/062120 filed Aug. 19, 2010, which claims foreign priority benefit under 35 U.S.C. §119 of German application 10 2009 028 664.0 filed Aug. 18, 2009 and 10 2009 056 060.2 Nov. 23, 2009.

The invention relates to a measurement system for the wireless and position-independent measurement of the temperature of the load of an oven with high accuracy using passive temperature probes, wherein the term "load of oven" may comprise a wide variety of things. Fields of application are industrial processes in which workpieces have to be heated to predetermined minimum temperatures or have to pass through a specific temperature profile, e.g., printed circuit boards in a soldering furnace. However, the oven may also be a cooking device for the slow cooking of food, for example.

The exact knowledge of the temperature of the load may be used for reducing the process times, saving energy, predicting the duration of the process, reducing the heat load, and optimizing the temperature processes.

Therefore, by using wireless temperature probes with a measuring result that is position-independent within the oven chamber, one can measure the temperature of the load of the oven that generally differs from the temperature of the atmosphere within the process chamber of the oven in non-static thermal processes due to a high thermal capacity of the load or due to a low thermal conductivity of the load.

STATE OF THE ART

One of the known technical solutions is a temperature measurement system in which the temperature probes are provided with cables that are coupled to the electronic evaluation unit of the oven. The handling of temperature probes with cable connections by the operator is very complicated. There is also a risk that the cable connections are easily damaged at higher temperatures.

Furthermore, wireless temperature probes are known that communicate with the electronic evaluation unit of the oven by means of active radio contact. This solution is very suitable for a temperature range of up to 125° C. At higher temperatures, there are serious problems with the active electronic system of the temperature probe and the energy source. Another disadvantage of this solution consists in the fact that, if a battery is used as an energy source in the process, the state of charge of the battery has to be checked. For oven temperatures of more than 125° C., solutions are known in which the active electronic system and the energy source are thermally insulated. However, this guarantees the functioning of the temperature measurement system for a limited period of time only. Said solutions are not suitable for continuous operation. Furthermore, they cannot be applied in many cases due to the size of the used components.

Another known solution consists in measuring the temperature of the load of the oven by means of infrared radiation, wherein it is not always possible to make a reliable measurement in dependence on the surface condition of the load of the oven. Furthermore, infrared sensors can only measure the temperature of the surface of the load of the oven; it is not possible to measure the profile of the temperature of the load of the oven from the surface into the interior of the load.

Furthermore, solutions for the passive and wireless measurement within the oven are known. DE 10 2004 047 758 A1 proposes a temperature sensor device for measuring the internal temperature of food that is to be cooked slowly. This solution employs the frequency dependence of the storage of vibration energy of at least two energy storages (resonators). However, the difference of the frequency dependence of the storage of vibration energy is not evaluated. Thus, the accuracy of the measurement very much depends on the design of the transmission path of the interrogation signal, i.e., the measuring result is position-dependent.

DE 10 2005 015 028 B4 proposes a method for measuring the temperature in a household appliance. The method described in DE 10 2005 015 028 B4 also employs the temperature dependence of the frequency of a surface-acoustic-wave device for temperature measurement. The above-mentioned position dependence of the measuring result is a disadvantage of this solution, too.

EP 1 882 169 B1 discloses a device for measuring a torque with resonance elements whose resonant frequencies depend on the torque as well as on the temperature. For determining the torque with high accuracy, the influence of the temperature has to be eliminated, whereby a temperature measurement is necessary in addition. For measuring the temperature by measuring the difference of the frequencies of three resonances, the associated resonators have to exhibit different temperature sensitivity characteristics. For achieving this, the frequencies and the designs of the resonators have to differ from each other, which is achieved by using a different cut of the substrate material or by varying the direction of propagation within a cut. In EP 1 882 169 B1, for example, a 34° crystal cut, a direction of propagation of −45° for resonance 2 and a direction of propagation of 0 to 30° for resonance 3 are used. This results in a significant change of the motional-inductance/motional-capacitance ratio of the resonators with the resonant frequency being the same and the resonator design being unchanged.

DE 10 2007 020 176 A1 proposes a measurement system for measuring the temperature in continuous furnaces, wherein several interrogation antennas are used for ensuring radio transmission in the furnace chamber. The temperature is determined from the temperature-dependent natural frequency of a surface-acoustic-wave device in this solution, too. The above-mentioned dependence of the accuracy of the measurement on the design of the transmission path is a disadvantage of this solution, too.

Buff et al., IEEE Ultrasonics Symposiums, 1996, pages 343 to 346, pointed to the dependence of the measuring result in the wireless and passive interrogation of temperature probes on the distance between the interrogation antenna and the sensor antenna, said temperature probes employing surface waves. Measuring the difference frequency of two surface-acoustic-wave devices that have different temperature sensitivity characteristics was presented as a solution for achieving increased measuring accuracy. A parameter that describes the improvement of measuring accuracy was introduced. Buff et al. did not deal with the properties surface-acoustic-wave devices have to exhibit in order to achieve a significant improvement of measuring accuracy.

A pressure sensor that employs surface-acoustic-wave devices is presented in WO 03/081195 A1. The sensor determines the pressure from the difference frequency of three surface-acoustic-wave resonators. WO 03/081195 A1 does not deal with the parameters that have to be taken into consideration in the designing of the surface-acoustic-wave resonators in order to achieve the smallest possible error in the wireless interrogation of the sensor with varying parameters of the transmission path.

A particularly critical issue in the wireless interrogation of passive temperature probes in the oven chamber is the reduction of the errors of measurement caused by changes in the properties of the transmission path of the interrogation signal. There is no free field where the interrogation signal can propagate between the interrogation antenna and the probe antenna in an undisturbed manner. Near-field effects caused by the interrogation antenna, the boundary of the oven chamber and the load of the oven influence the system that consists of the probe antenna and the resonator. The resonant frequency of the resonator that should only depend on the temperature of the resonator is changed. Errors of measurement occur. A measuring result that is independent of the position of the temperature probe in the oven chamber cannot be achieved.

OBJECT OF THE INVENTION

The object of the invention is to provide a measurement system for the wireless, position-independent and continuous measurement of the temperature of the load of an oven within the oven chamber with small errors of measurement.

DESCRIPTION OF THE INVENTION

According to the invention, the object of the invention is achieved by the features of patent claim 1. The subclaims reveal advantageous realizations and further developments of the invention.

The invention comprises a measurement system with an interrogation unit located outside the oven chamber, one or more interrogation antennas located in the oven chamber and at least one passively operated and freely movable temperature probe with a probe antenna with at least one temperature sensor designed as a resonator for the wireless measurement of the temperature of the load of the oven chamber.

We propose a temperature sensor with at least two resonances with different temperature coefficients of frequency and the designing of the resonance elements in such a manner that their electrical equivalent circuit diagrams differ only slightly from each other, wherein the temperature is not determined on the basis of the frequency positions of the individual resonances but on the basis of the difference of the frequencies of the resonances. The frequencies of the individual resonances may now be changed by influences of the transmission path of radio interrogation (antenna near-field effects) or by mismatching between the probe antenna and the temperature sensor. However, the changes are approximately identical because of the approximately identical electrical equivalent circuit diagrams of the resonance elements. Thus, the difference frequency of the individual resonances is not influenced. The measuring signal is stable.

The resonance elements have to be designed in such a manner that there is a minimum spacing between their resonant frequencies in the operating temperature range, said minimum spacing making a one-to-one assignment of the resonances to the resonance elements possible. In order to be able to unambiguously determine the temperature from the difference of the resonant frequencies of the resonance elements, the temperature coefficients of the resonant frequencies of the resonance elements have to differ from each other. In order to obtain an unambiguous assignment of the difference frequency to the temperature, the derivative of the difference frequency with respect to temperature must not have any zeros.

A linearly increasing or linearly decreasing difference of the resonant frequencies over the temperature is particularly advantageous. This enables the measurement system to be designed in such a manner that the error of measurement in the operating temperature range is as constant as possible.

The quality of the resonance elements is one of the factors that influence the achievable measuring accuracy of the system. It is therefore particularly advantageous to design the resonance elements as surface-acoustic-wave resonators or bulk-acoustic-wave resonators. These resonators employing acoustic waves exhibit a high quality with thermal capacity being low and manufacturing costs being low.

Designing the resonance elements as surface-acoustic-wave resonators is a particularly advantageous solution. This solution allows the designing of particularly small resonance elements that exhibit a particularly low thermal capacity. In this case it may be advantageous to design the resonance elements on a common chip, whereby the design of the resonators is simplified. However, designing the resonance elements on different chips may be advantageous, too. This allows the use of different wafer cuts or wafer materials for the processing of the resonance elements, which may be advantageous with respect to the design of the measurement system and the demands on process accuracy in the processing of the resonance elements.

Designing the resonance elements in such a manner that they are within an ISM band is particularly advantageous. This enables the measurement system to be integrated into ovens that exhibit only little shielding of the radiofrequencies that are used for interrogating the temperature probe.

Designing the measurement system for the frequency range of the ISM band at 433.92 MHz is particularly advantageous. The size of the resonators generally decreases with increasing resonant frequency. On the other hand, demands on process stability increase with increasing frequency, and the quality of the resonance elements decreases. The frequency range at 433.92 MHz is a particularly good compromise.

Designing the measurement system for the frequency range of the ISM band at 915 MHz is particularly advantageous, too. With this design, relatively high qualities for the resonance elements are still achievable, wherein the resonators are particularly small.

The integration of the probe antenna into the temperature sensor is a particularly advantageous solution. This solution allows the designing of a particularly small temperature probe. Since this solution generally involves higher losses in the probe antenna, it is particularly advantageous for applications that make particularly low demands on the working range.

There are a number of applications (e.g., measuring the temperature profile of food that is to be cooked slowly in a cooking device, wherein the temperature profile is measured from the surface of the food into the interior of the food) in which at least two temperature sensors have to be contained in the temperature probe in order to enable the temperature profile to be measured. Furthermore, the accuracy of the measurement may be further increased by the integration of further temperature sensors into the temperature probe and by the evaluation of the measuring results of all temperature sensors. Therefore, a temperature probe having more than one temperature sensor is a particularly advantageous realization of the invention. In this realization of the invention, the resonance elements of the individual temperature sensors have to be designed in such a manner that there is a minimum spacing between their resonant frequencies in the operating temperature range, said minimum spacing making a one-to-one assignment of the resonances to the resonance elements possible.

In other applications, e.g., measuring the temperature of a printed circuit board in a continuous furnace, it may be advantageous to measure the temperature in various spots of the load of the furnace or to measure the temperature of various parts of the load of the furnace. A measurement system having more than one temperature probe is a particularly advantageous embodiment of the invention.

The inventive system for the wireless measurement of the temperature of the load in an oven has an interrogation unit, one or more interrogation antennas that can be positioned within the oven chamber, a passively operated temperature probe with a probe antenna and with at least one temperature sensor designed as a resonator, wherein the temperature probe can be positioned within the oven chamber, and an evaluation unit, wherein the temperature sensor has at least a first resonance element and a second resonance element, wherein the first resonance element and the second resonance element are designed in such a manner that the motional capacitance of the first resonance element differs from the motional capacitance of the second resonance element by less than 50% a time (more preferably 20%, even more preferably 15%) at 20° C. Furthermore, the motional inductance of the first resonance element differs from the motional inductance of the second resonance element by less than 50% a time (more preferably 20%, even more preferably 15%). Furthermore, the dynamic resistance of the first resonance element differs from the dynamic resistance of the second resonance element by less than 50% a time (more preferably 20%, even more preferably 15%).

The parameters "motional capacitance", "dynamic resistance" and "motional inductance" are defined in greater detail in Bernd Neubig and Wolfgang Briese, "Das Grosse Quarzkochbuch", Franzis-Verlag, 1997, for example. The dynamic resistance is often referred to as "motional resistance" or "resonant impedance".

The evaluation unit is preferably designed to determine the temperature of the load of the oven from the difference between the resonant frequency of the first resonance element and the resonant frequency of the second resonance element. Preferably, the motional capacitance of the first resonance element differs from the motional capacitance of the second resonance element by less than 10% a time (more preferably 7%, even more preferably 4%). Preferably, the motional inductance of the first resonance element differs from the motional inductance of the second resonance element by less than 10% a time (more preferably 7%, even more preferably 4%). Preferably, the dynamic resistance of the first resonance element differs from the dynamic resistance of the second resonance element by less than 10% a time (more preferably 7%, even more preferably 4%).

Preferably, the dynamic resistance of the first resonance element differs from the dynamic resistance of the second resonance element. Preferably, the motional inductance of the first resonance element differs from the motional inductance of the second resonance element. Preferably, the motional capacitance of the first resonance element differs from the motional capacitance of the second resonance element. At least one of the parameters of dynamic resistance, motional inductance and motional capacitance of the first resonance element differs from the respective parameter of the second resonance element.

Preferably, the product of the motional inductance and the motional capacitance of the first resonance element differs from the product of the motional inductance and the motional capacitance of the second resonance element by at least 0.01% (more preferably 0.05%, even more preferably 0.1%) in the temperature range between 0° C. and 250° C.

Preferably, the resonant frequency of the first resonance element differs from the resonant frequency of the second resonance element in the (preferably entire) range of 20° C. to 200° C. Preferably, there is a steadily increasing or steadily decreasing difference of the resonant frequencies of the resonance elements in the range of 20° C. to 200° C. Preferably, there is a linearly increasing or linearly decreasing difference of the resonant frequencies of the resonance elements in the range of 20° C. to 200° C. Preferably, the amount of the derivative of the resonant frequency with respect to the temperature of the first resonance element is greater than the amount of the derivative of the resonant frequency with respect to the temperature of the second resonance element in the entire range of 20° C. to 200° C. Alternatively, the amount of the derivative of the resonant frequency with respect to the temperature of the first resonance element is smaller than the amount of the derivative of the resonant frequency with respect to the temperature of the second resonance element preferably in the entire range of 20° C. to 200° C.

Preferably, the resonance elements are designed as surface-acoustic-wave resonators or as bulk-acoustic-wave resonators. Preferably, the resonance elements are designed on one chip or on different chips. Preferably, the resonant frequencies of the resonance elements in the operating temperature range are within an ISM band. Preferably, the resonant frequencies of the resonance elements are in the ISM band at 433.92 MHz or in the ISM band at 915 MHz. Preferably, the probe antenna is integrated into the temperature sensor or designed as a separate probe antenna. Preferably, more than one temperature sensor are arranged within the temperature probe. Preferably, the inventive system has more than one temperature probe. Preferably, the temperature probe can be permanently fixed to the load of the oven. Preferably, the temperature probe can be reversibly fixed to the load of the oven.

In the following, the invention will be explained in greater detail on the basis of exemplary embodiments.

Figure 1:
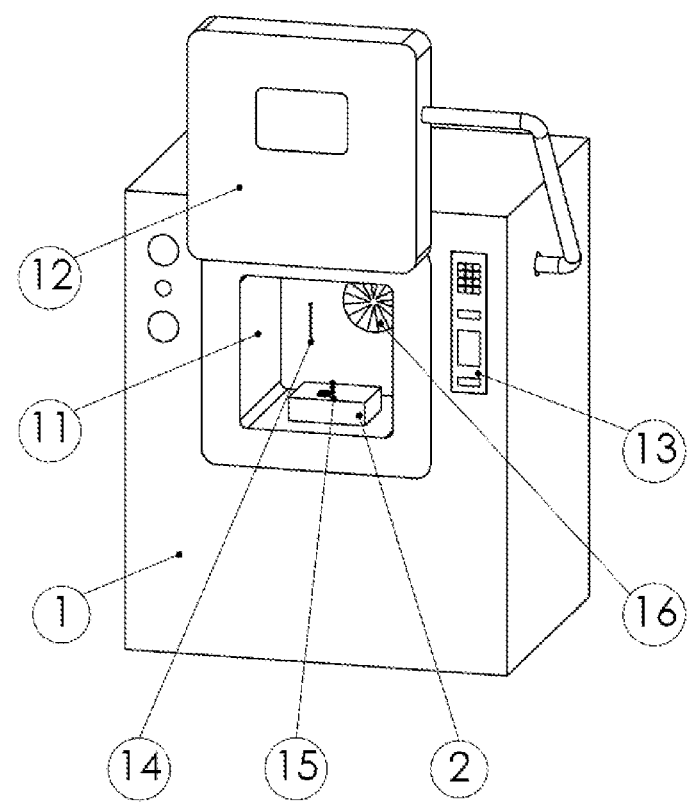
FIG. 1 shows an oven with a measurement system for the wireless and passive measurement of the temperature of the load of the oven.

FIG. 1 shows an exemplary embodiment of the inventive measurement system for the wireless and position-independent measurement of the temperature of the load of the oven with high accuracy by means of passive temperature probes, wherein the oven is designed as an industrial furnace 1 in the present example. The door 12 closes the oven chamber 11 when the oven is in operation. The interrogation antenna 14 and the wireless temperature probe 15 of the measurement system are located in the oven chamber of the oven. Furthermore, a load in the form of a workpiece 2 is located in the oven chamber of the oven. The wireless temperature probe is in thermal contact with the workpiece. The interrogation unit of the measurement system is integrated into the electronic control unit of the oven 13. The oven chamber of the oven is connected to a heating and air-pulsing module 16. The heating and air-pulsing module is controlled by means of the electronic control unit of the oven in such a manner that the temperature of the workpiece passes through a predetermined temperature profile, wherein the current temperature of the workpiece is used as a controlled variable while the temperature profile is passed through. The current temperature of the workpiece is measured in a wireless manner by means of the inventive measurement system. For this purpose, HF signals are generated by the interrogation unit and transmitted to the wireless and passive temperature probe 15 by the interrogation antenna 14. The probe antenna of the temperature probe 15 forwards the HF signals to the temperature sensor. The temperature sensor contains at least two resonance elements that are electrically connected to the probe antenna. Some parts of the interrogation signal are temporarily stored in the resonance elements and reemitted by the probe antenna. After the deactivation of the interrogation signal, said stored parts can be received by means of the interrogation unit and evaluated in the interrogation unit. The resonant frequencies of the resonance elements are determined in the interrogation procedure, wherein the temperature is determined from the difference of the resonant frequencies of the resonance elements. The resonance elements are designed in such a manner that their electrical equivalent circuit diagrams differ only slightly from each other. Thus, the influence of the position of the probe antenna in the oven chamber on the difference of the resonant frequencies of the resonance elements by the near-field effects is reduced to a low level, said near-field effects influencing the impedance of the antenna with respect to the temperature sensor and being caused by the workpiece, the boundary of the oven chamber and the interrogation antenna.

Figure 2:
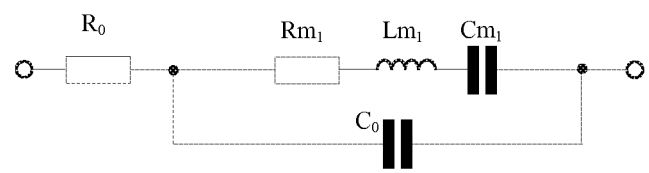
FIG. 2 shows an electrical equivalent circuit diagram of the surface-acoustic-wave resonator of a conventional measurement system for the wireless and passive measurement of the temperature in household appliances, said surface-acoustic-wave resonator being employed as a temperature sensor.

FIG. 2 is a detailed representation of the electrical equivalent circuit diagram of the surface-acoustic-wave resonator of a conventional measurement system for the wireless and passive measurement of the temperature in household appliances, said surface-acoustic-wave resonator being employed as a temperature sensor. $R_{m1}$, $L_{m1}$ and $C_{m1}$ represent the dynamic resistance, the motional inductance and the motional capacitance. $C_0$ represents the static capacitance of the resonator. $R_0$ represents the ohmic resistance of the feeder of the resonator. Since the resonant frequency of the resonator depends on the temperature, $R_{m1}$, $L_{m1}$ and $C_{m1}$ also depend on the temperature. In conventional wireless and passive temperature probes, these surface-acoustic-wave resonators are connected between the antenna and ground. The surface-acoustic-wave resonator is terminated by the impedance of the antenna. In the oven chamber, the impedance of the antenna may be changed by near-field effects in a position-dependent manner. The resonator is detuned. Thus, the resonant frequency changes in a position-dependent manner. An error of measurement occurs.

Figure 3:
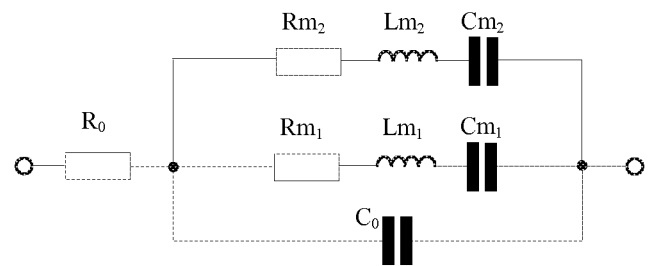
FIG. 3 shows an electrical equivalent circuit diagram of a sensor with two resonances for determining the temperature on the basis of the difference frequency of the resonances, said sensor employing surface acoustic waves.
Figure 4:
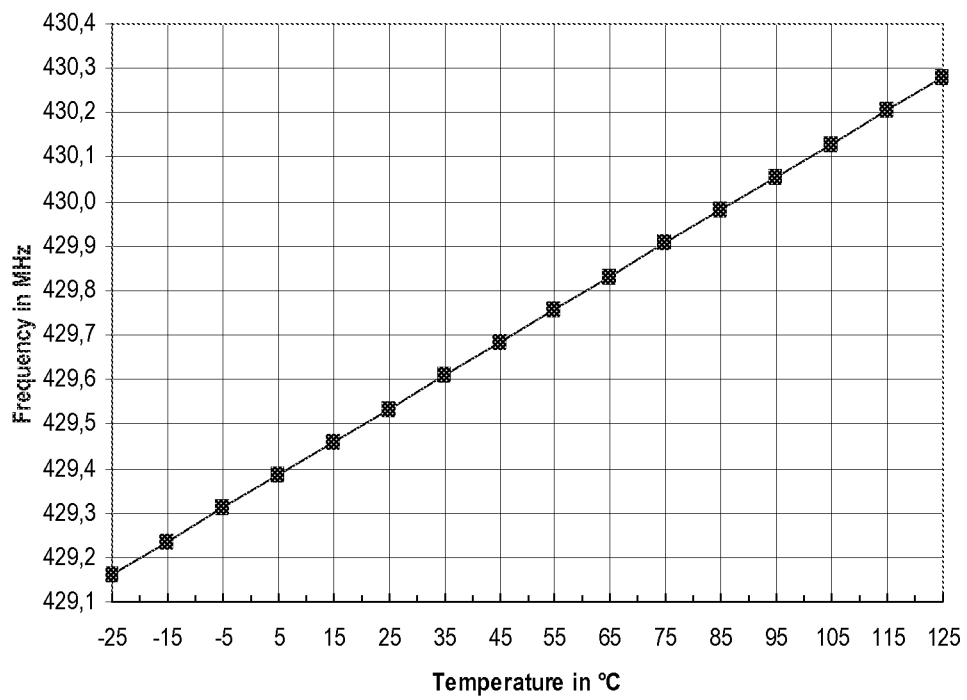
FIG. 4 shows the frequency response of the surface-acoustic-wave resonator of a conventional measurement system for the wireless and passive measurement of the temperature in household appliances, said surface-acoustic-wave resonator being employed as a temperature sensor.

FIG. 3 shows the electrical equivalent circuit diagram of a sensor with two resonances for determining the temperature on the basis of the difference frequency of the resonances, said sensor employing surface acoustic waves. The two resonance elements are connected in parallel. $R_{m1}$, $L_{m1}$ and $C_{m1}$ represent the dynamic resistance, the motional inductance and the motional capacitance of the first resonance element. $R_{m2}$, $L_{m2}$ and $C_{m2}$ represent the dynamic resistance, the motional inductance and the motional capacitance of the second resonance element. $C_0$ represents the static capacitance of the parallel connection of the two resonance elements. $R_0$ represents the ohmic resistance of the feeder of the two resonance elements. The resonant frequencies of the two resonance elements depend on the temperature to different degrees. Therefore, $R_{m1}$, $L_{m1}$ and $C_{m1}$ as well as $R_{m2}$, $L_{m2}$ and $C_{m2}$ depend on the temperature, but to different degrees. In a wireless and passive temperature probe, the sensor is electrically connected between the probe antenna and ground. Both resonance elements are terminated by the same impedance. The impedance of the antenna is changed in the oven chamber by near-field effects in a position-dependent manner in this circuit, too. The frequencies of both resonance elements are pulled and the resonant frequencies change. The change of the resonant frequencies depends on the values of the equivalent elements of the resonance elements. The frequencies of both resonance elements are pulled up or pulled down. If the temperature is determined from the difference of the resonant frequencies of the two resonance elements, the resulting error of measurement is generally smaller than an error of measurement occurring in a temperature probe that has only one resonance element. The error of measurement has a tendency to become zero if the equivalent elements $R_{m1}$, $L_{m1}$ and $C_{m1}$ of the first resonance element and $R_{m2}$, $L_{m2}$ and $C_{m2}$ of the second equivalent element differ only slightly from each other according to the invention. $R_{m1}$, $L_{m1}$ and $C_{m1}$ can never be identical with $R_{m2}$, $L_{m2}$ and $C_{m2}$ because the resonant frequencies of resonance element 1 and resonance element 2 would otherwise not differ from each other. The different temperature sensitivity characteristics of resonance elements 1 and 2 are mainly achieved by using different crystal cuts or different directions of propagation of a crystal cut. The resulting different material parameters of the crystals make the designing of resonance elements having approximately identical equivalent elements more expensive.

Figure 5:
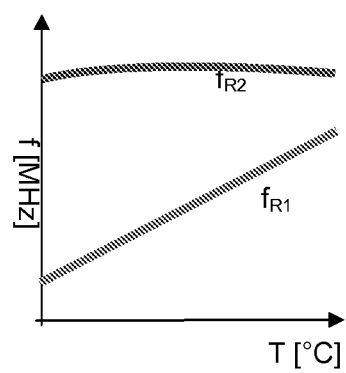
FIG. 5 shows the temperature sensitivity characteristics of two resonance elements of a sensor for determining the temperature on the basis of the difference frequency of the resonances, said sensor employing surface acoustic waves.

FIG. 5 shows the temperature sensitivity characteristics of two resonance elements of a sensor for determining the temperature on the basis of the difference frequency of the resonances, said sensor employing surface acoustic waves, wherein $f_{R1}$ is the resonant frequency of a first resonance element of a temperature sensor in the operating temperature range of the wireless and passive temperature probe and $f_{R2}$ is the resonant frequency of a second resonance element, said temperature sensor being used in the temperature probe. The temperature sensitivity characteristics and the frequency positions of both resonance elements are selected such that at all temperatures within the operating temperature range there is a minimum spacing between the resonant frequencies of both resonance elements and an unambiguous assignment of the difference frequency of the two resonance elements to the temperature of the temperature sensor is possible. Furthermore, the resonant frequencies are selected such that the resonant frequencies of both resonance elements are within the ISM band at 433.92 MHz in the entire operating temperature range.

LIST OF REFERENCE NUMERALS 1 oven/industrial furnace
2 load/workpiece
11 interior/oven chamber
12 door of the oven 13 electronic control unit of the oven
14 interrogation antenna
15 temperature probe
16 heating and air-pulsing module

The invention claimed is:

1. A system for the wireless measurement of the temperature of the load in an oven having:
   an interrogation unit,
   one or more interrogation antennas that can be positioned within the oven chamber,
   a passively operated temperature probe with a probe antenna and with at least one temperature sensor designed as a resonator, wherein the temperature probe can be positioned within the oven chamber,
   an evaluation unit,
   wherein the temperature sensor has at least a first resonance element and a second resonance element,
   wherein
   the evaluation unit is designed to determine the temperature of the load of the oven from the difference between the resonant frequency of the first resonance element and the resonant frequency of the second resonance element, wherein
   the first resonance element and the second resonance element are designed in such a manner that the dynamic resistance, the motional inductance and the motional capacitance of the first resonance element differ by less than 20% each from the dynamic resistance, the motional inductance and the motional capacitance of the second resonance element at 20° C.

2. The system according to claim 1, wherein the motional capacitance of the first resonance element differs from the motional capacitance of the second resonance element by less than 10% a time.

3. The system according to claim 1, wherein the motional capacitance of the first resonance element differs from the motional capacitance of the second resonance element by less than 7% a time.

4. The system according to claim 1, wherein the motional capacitance of the first resonance element differs from the motional capacitance of the second resonance element by less than 4% a time.

5. The system according to claim 1, wherein the dynamic resistance of the first resonance element differs from the dynamic resistance of the second resonance element and/or the motional inductance of the first resonance element differs from the motional inductance of the second resonance element and/or the motional capacitance of the first resonance element differs from the motional capacitance of the second resonance element.

6. The system according to claim 1, wherein the product of the motional inductance and the motional capacitance of the first resonance element differs from the product of the motional inductance and the motional capacitance of the second resonance element by at least 0.05% in the temperature range between 0° C. and 250° C.

7. The system according to claim 1, wherein the resonant frequency of the first resonance element differs from the resonant frequency of the second resonance element in the entire temperature range of 20° C. to 200° C.

8. The system according to claim 1, wherein there is a steadily increasing or steadily decreasing difference of the resonant frequencies of the resonance elements in the range of 20° C. to 200° C.

9. The system according to claim 1, wherein there is a linearly increasing or linearly decreasing difference of the resonant frequencies of the resonance elements in the range of 20° C. to 200° C.

10. The system according to claim 1, wherein the amount of the derivative of the resonant frequency with respect to the temperature of the first resonance element is greater than the amount of the derivative of the resonant frequency with respect to the temperature of the second resonance element in the entire range of 20° C. to 200° C.

11. The system according to claim 1, wherein the amount of the derivative of the resonant frequency with respect to the temperature of the first resonance element is smaller than the amount of the derivative of the resonant frequency with respect to the temperature of the second resonance element in the entire range of 20° C. to 200° C.

12. The system according to claim 1, wherein the resonance elements are designed as surface-acoustic-wave resonators or that the resonance elements are designed as bulk-acoustic-wave resonators.

* * * * *